(No Model.)

C. K. LONGENECKER.
CRANK SHAFT.

No. 491,487. Patented Feb. 7, 1893.

Witnesses.
Victor J. Evans.
Geo. M. Copenhaver.

Inventor.
Charles K. Longenecker,
By W. A. Redmond
Attorney.

UNITED STATES PATENT OFFICE.

CHARLES K. LONGENECKER, OF PAINTED POST, NEW YORK, ASSIGNOR TO THE WESTON ENGINE COMPANY, OF SAME PLACE.

CRANK-SHAFT.

SPECIFICATION forming part of Letters Patent No. 491,487, dated February 7, 1893.

Application filed September 17, 1892. Serial No. 446,181. (No model.)

*To all whom it may concern:*

Be it known that I, CHARLES K. LONGENECKER, a citizen of the United States, residing at Painted Post, in the county of Steuben and State of New York, have invented certain new and useful Improvements in Crank-Shafts for Steam-Engines; and I do hereby declare the following to be a full, clear, and exact description of the invention, such as will enable others skilled in the art to which it appertains to make and use the same.

This invention relates, generally, to the crank shafts of steam engines and particularly to the balancing disks thereof, and it has for its main object to provide a crank shaft whose counter-balancing disks may be removed and replaced without affecting their "truth" in running, and it consists in the novel manner of constructing, arranging and securing the parts as will be hereinafter fully described and claimed.

Figure 2:
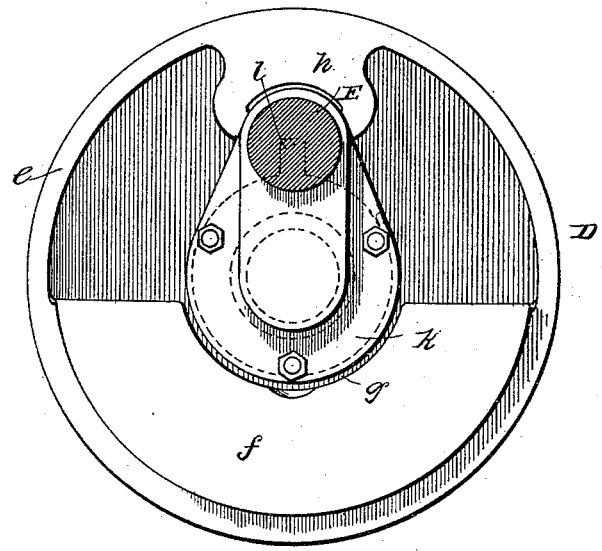
Figure 1:
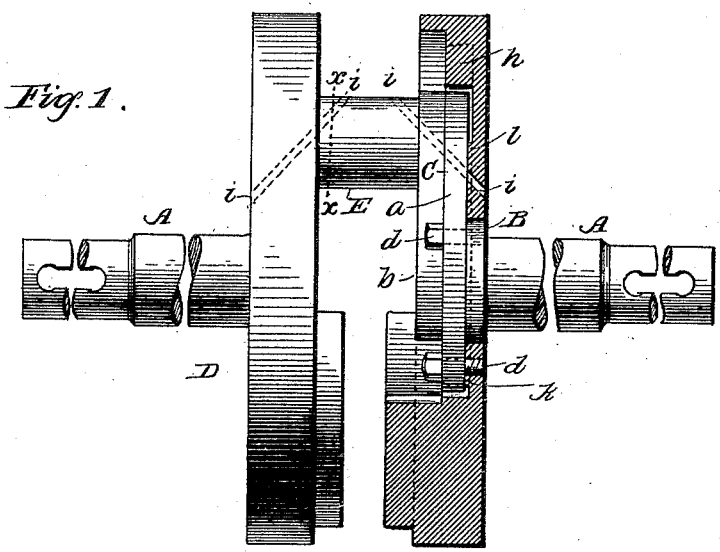

In the accompanying drawings forming a part of this specification—Figure 1 is a side elevation of my improved shaft showing one disk in full lines and the other in section; Fig. 2 a vertical section on the line $x$—$x$, Fig. 1; and Fig. 3 a detail perspective view of the shaft with the disks removed.

Similar letters refer to similar parts throughout the several views.

Figure 3:
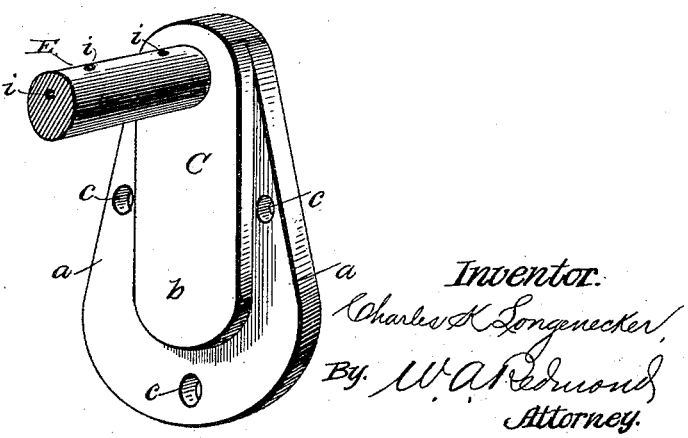

A represents the shaft, B circular bosses, C crank arms or webs, and E a wrist pin, all cast together in one piece of steel. Each of the crank arms or webs, as best shown in Fig. 3, is formed with a flange $a$, ovoidal in outline, and of less thickness than the body or main part $b$ of the web, through which openings $c$ are drilled to receive the studs $d$ of the counterbalancing disks D to secure the latter to the shaft. The disks D are each formed with a peripheral flange $e$ and their lower halves are enlarged or thickened on their inner faces to form counterbalancing weights $f$ which are semi-circular in shape. An opening $g$ is formed in the center of each of the disks adapted to accurately fit the bosses B cast on the shaft A at the points where the shaft joins the crank arms or webs, and a projection $h$ is cast on the inner face of each of the disks, which projection is formed to extend over the upper ends of the crank arms or webs and bear at its ends against the sides of the arms or webs and thus afford additional strength to said arms. Oil ducts $i$ are drilled through the wrist pin, from its upper surface, and through the crank arms or webs, and through the webs of the disks on inclining or diverging lines, as shown, each of the disks being formed with a slight boss $k$ against which the crank arms bear and said bosses being extended, as at $l$, Fig. 2, so as to carry the same above or past the point where the oil ducts of the crank arms connect with or join the oil ducts in the disks, thus forming a joint to prevent leakage of oil at these points. The studs $d$ are screwed into the disks and cut off flush with the outer faces of the disks, and pass through the openings $c$ of the flange $a$, and nuts are run thereon to retain the parts together, which, however, are readily separated and the disks removed when it becomes necessary to "true" the wrist pins, as frequently occurs.

It will be observed that the crank arms have a lateral bearing at their upper ends on each side against the projections $h$ and also against the bosses $k$ of the disks, and that the union of the parts is practically the same as if they were cast in one piece, and yet enabling them to be readily separated when necessary and their replacement again without in any manner affecting the running of the disks to their detriment. Also it will be noticed that the construction described furnishes a secure and substantial bearing for the disks as they are mounted on the bosses B with the inner faces of their bosses $k$ bearing directly and at all points of their surfaces on the flanges $a$ of the crank arms or webs C, and are there secured by the studs passing through the bodies of the flanges $a$ and bosses $k$ at a sufficient distance from their edges to insure ample strength of the parts to withstand the strain put on them while the engine is running.

Having thus described my invention what I claim as new and desire to secure by Letters Patent is:—

1. The combination, with a crank shaft having an integral crank arm or web provided with a lateral flange, of a counterbalancing disk concentrically mounted on said shaft and adapted to be removably secured to the face of said flange, substantially as described.

2. The combination, with a crank shaft having an integral crank arm or web provided with a lateral flange, of a counterbalancing disk concentrically mounted on said shaft and removably secured to the outer face of said flange and having projections adapted to fit against the sides of said crank arm or web at its outer end, substantially as described.

3. The combination, with a crank shaft, the bosses, the laterally flanged crank arms or webs, and a wrist pin all in one piece, of weighted disks centrally mounted on said bosses and removably secured to said flanged arms or webs and having projections adapted to bear against the sides of said arms or webs at their outer ends, substantially as described.

4. The combination, with a crank shaft having flanged crank arms or webs, and a wrist pin formed with oil ducts, of weighted disks removably secured to said flanged arms and having oil ducts corresponding to those of the wrist pin and formed with bosses having extensions to prevent the leakage of oil, substantially as described.

In testimony whereof I affix my signature in presence of two witnesses.

CHARLES K. LONGENECKER.

Witnesses:
A. E. IREDELL,
H. L. HOLLISTER.